Nov. 24, 1970   W. PUTZ ET AL   3,543,038
ELECTRICAL APPARATUS FOR SLOWLY TURNING THE ROTOR
OF AN ELECTRICAL MACHINE
Filed Jan. 30, 1968

Inventors
Walter Putz
Anton Lampert
BY Spencer & Kaye
Attorneys

United States Patent Office 3,543,038
Patented Nov. 24, 1970

3,543,038
ELECTRICAL APPARATUS FOR SLOWLY TURNING THE ROTOR OF AN ELECTRICAL MACHINE
Walter Putz and Anton Lampert, Mulheim (Ruhr), Germany, assignors to Licentia Patent-Verwaltungs G.m.b.H., Frankfurt am Main, Germany
Filed Jan. 30, 1968, Ser. No. 701,685
Claims priority, application Germany, Feb. 20, 1967, L 55,777
Int. Cl. H02p 9/14
U.S. Cl. 290—38          5 Claims

ABSTRACT OF THE DISCLOSURE

Electrical apparatus for slowly turning the rotor of an electrical machine, such as the main shaft of a turbogenerating plant. The apparatus comprises a polyphase—usually a three-phase—electric motor, the rotor of which is attached to or forms a part of the shaft to be turned, and a power source connected to this electric motor for producing three-phase power at a frequency substantially less than the 60 Hertz power which is the frequency of the usually available power. This power source includes three D.C. generators in Y connection the field windings of which are excited by three-phase power of the desired frequency.

BACKGROUND OF THE INVENTION

The present invention relates to apparatus for slowly turning the rotor of an electrical machine or, in particular, a turbogenerating plant. The apparatus comprises a three-phase electric motor fed low frequency power generated by three D.C. generators. The field windings of the D.C. generators are synchronously excited by low frequency alternating current.

Apparatus for slowly turning the rotor of an electric turbogenerator has normally involved a friction wheel, gear or a toothed clutch half attached to the rotor or the rotor shaft clutch and connected mechanically to some outside rotating power source. The disadvantages of this type of rotational drive are well known. Contact with the rotor or locking of gears will occur during operation, and since a transmission as well as a separate drive motor, or often, in fact, several drive motors are necessary, these rotational drives are generally costly.

There is, however, one known rotor drive means which may, at least theoretically, operate without physical contact with the rotor. Rotor torque is applied by jets of oil, emitted from stationary nozzles, striking a turbine bucket ring mounted on the rotor shaft of the turbogenerator. This oil turbine construction has its disadvantages too, however. A completely enclosed housing is required to contain the oil and there is a danger that the nozzles and the moving buckets will come in contact with each other.

Danger of physical contact is not present at all in several of the known electrically powered means for rotating a turbogenerating plant. In one such system the excitation generator of the turbo set, directly coupled to the turbo-generator rotor, is used as a motor to turn the rotor. This excitation generator can only be practically employed, however, for rotating small and medium sized turbogenerating plants. Because of the low rotary speed of the electric excitation generator, costly ventilating equipment is required and additional equipment is necessary for controlling the power to the excitation generator when operated as a motor. Finally, this system can not be used when the turbogenerator receives its excitation from an outside source.

In another known electrical system for slowly rotating the rotor shaft of a turbogenerating plant the main generator itself is driven as an electric motor by three-phase power, applied to the stator. Because the rotary speed of the shaft would be too high if this three-phase power were at the 60 Hertz frequency available on the commercial power system (50 Hertz in Europe), the power must be generated by a separate synchronous alternator or by a frequency converter. The disadvantage here, of course, is the high cost of such a synchronous alternator or frequency converter capable of producing the low frequency required for the low rotary speed.

SUMMARY OF THE INVENTION

An object of the present invention is to minimize the cost of producing tree-phase power of the necessary low frequency required to drive the rotor of a turbogenerating plant at an idling speed.

This and other objects which will become apparent in the discussion that follows are achieved by operating three D.C. generators in a synchronous manner with their field windings excited by an alternating current of a controlled frequency considerably less than 60 cycles per second so that the voltages produced by the three generators are sinusoidal and separated in phase by 120°. Because these D.C. generators can be of the standard high r.p.m. commercial variety their total cost will be less than the specially built synchronous generators or frequency converters previously used in the art. The three generators can be of relatively low power and can be run at their normal rated speed; for example, 1500 or 3000 r.p.m. Their use in conjunction with the stator of the main generator or some other motor arranged on the turbogenerating plant main shaft obviates the disadvantages mentioned above of a friction wheel, a gear or a geared clutch member and the disadvantages of a narrow air space between an oil nozzle and a turbine bucket ring.

The three generators used in the present invention are all identical. In general, their rotors should all be rigidly coupled to maintain their alignment. More particularly, these three rotors should be rigidly coupled with the rotor of the electric driving motor to maintain the alignment of all four.

The three-phase power produced in this way can be fed to the stator of a three-phase motor, especially designed to turn the shaft or rotor of a turbogenerating plant. This three-phase motor will have few poles and can therefore be designed with large air gaps. The rotor of this motor, furthermore, can be directly coupled to the main shaft of the turbogenerator which is to be slowly rotated.

The main generator or one of the main generators can also be connected as a three-phase motor to the three-phase power generated as noted above. This generator can be operated as an asynchronous motor by shorting its rotor inductor winding either directly or through a resistor. The generator can also be run as a synchronous motor by weakly exciting the rotor winding with separately generated direct current. Although separate apparatus will be required to produce this direct current its power capacity need not be very great and it would minimize the magnetic field currents flowing in the iron parts of the generator rotor. Although this apparatus can consist of rectifiers, it is more practical to add an additional small D.C. generator to the triple D.C. generator system mentioned above. The rotor of this latter D.C. generator could then be rigidly coupled with the three generators producing the three-phase power as well as the electric motor driving the same so that all five machines remain in alignment.

The apparatus according to the present invention is for instance, also suitable for slowly rotating the rotor of a turbo compressor, driven by a steam or gas turbine. It may be in fact employed to drive any machine where a slow auxiliary speed is required. When used in conjunction with an electric power generating plant the three D.C. generators can also be used as an emergency generator excitation set. These generators, themselves excited, in this case, by D.C. power, could be connected either in series or in parallel.

DESCRIPTION OF THE PREFERRED EMBODIMENT

Figure 1:
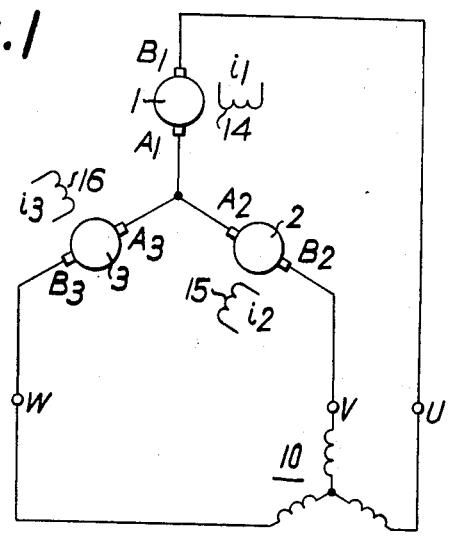
FIG. 1 shows a circuit diagram of apparatus for producing low frequency three-phase power according to the preferred embodiment of the invention.

Referring now to the drawings, FIG. 1 shows three D.C. generators connected to produce three-phase power of a frequency substantially less than 60 cycles. Field windings 14, 15 and 16 of three identical D.C. generators 1, 2 and 3 are supplied with direct currents $i_1$, $i_2$ and $i_3$, respectively, all of the same frequency, approximately 0.5–3 cycles, and separated in phase, each from the other, by 120°. The armatures of the three D.C. generators are connected together at terminals $A_1$, $A_2$ and $A_3$; three-phase power thus appears at terminals $B_1$, $B_2$ and $B_3$.

The three-phase power obtained from the system of the present invention is connected to terminals U, V, W of the stator of the generator 10 which serves to slowly rotate the rotor of the turbogenerating set. The inductor winding 11 of the generator, rigidly coupled to the rotor of the turbogenerating set, is shown in (a) open-circuited, (b) short-circuited and in (c) short-circuited through an electrical resistor 12. When connected as in cases $a$, $b$ and $c$ the generator operates as an asynchronous motor. When the inductor winding 11 is connected to a D.C. generator 13 as shown in (d), and is weakly excited, the generator functions as a synchronous motor.

Figure 2:
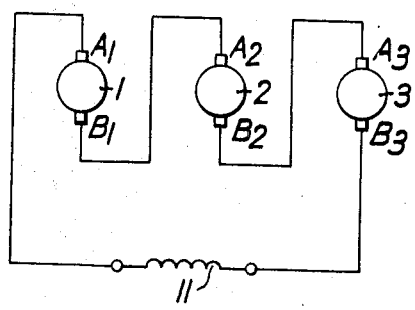
FIG. 2 is a circuit diagram showing how the generators used in the present invention may be connected to form an emergency source of D.C. excitation.
Figure 2:
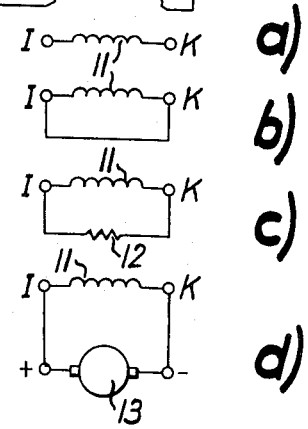

FIG. 2 illustrates another advantage of utilizing three D.C. generators to form the three-phase power source utilized to energize the generator 10 when it is utilized as a motor. As shown in the figure, the three D.C. generators 1, 2 and 3 may be connected in series to form an emergency D.C. excitation supply. When the three generators 1, 2, and 3 are connected in this manner, the field windings thereof are excited by D.C. power as is conventional in the art. Direct current produced in this manner is connected across inductor winding 11 for excitation of the main generator 10 when it is operated in its normal manner, i.e. as a generator.

Figure 3:
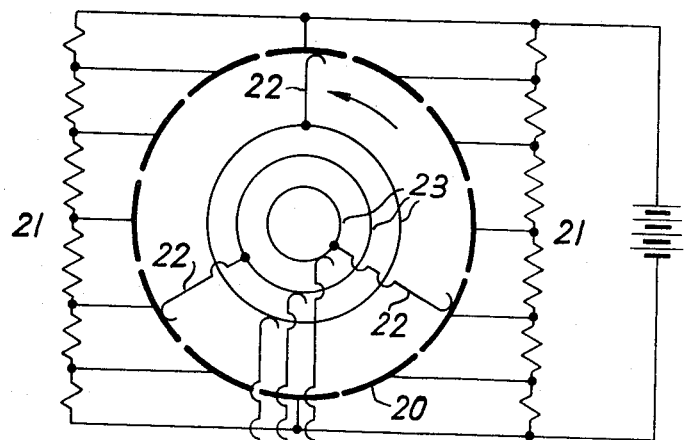
FIG. 3 is a representational diagram showing means for generating a three-phase excitation current which may be used with the apparatus shown in FIG. 1.

The excitation currents $i_1$, $i_2$ and $i_3$ of the proper frequency and phase can be generated in a manner well known in the art, shown in FIG. 3. A stationary commutator 20 is connected around its circumference to a number of resistors 21 of different values fed by a single D.C. power source. Either three or six rotating brushes 22 connected to the three D.C. generator windings; by means of slip ring 23 will serve to take the current which approximates a sinusoid from the commutator.

It will be understood that the above description of the present invention is susceptible to various modifications, changes, and adaptations, and the same are intended to be comprehended within the meaning and range of equivalents of the appended claims.

We claim:
1. In a turbogenerating plant for generating electricity having a main rotor shaft and at least one main generator arranged on said shaft, said main generator having a rotor and a three-phase stator winding arranged around said rotor, the improvement comprising:
   a three-phase power source including:
   (1) three D.C. generators electrically connected in star configuration, each of said generators having a field winding; and
   (2) a three-phase source of A.C. excitation, each phase thereof being displaced by 120° and connected to a respective one of said field windings, said source of excitation having a frequency substantially less than 60 Hertz;
   said three-phase power source being connected to said three-phase stator winding whereby said main generator functions as a motor to rotate said shaft at a speed which is substantially less than the speed at which it would be rotated were said stator winding connected to a commercial power source having a frequency of 60 Hertz.

2. Electrical apparatus according to claim 1, wherein said rotor includes a winding which is open-circuited short-circuited or short-circuited through a resistor, whereby said main generator is operated as an asynchronous motor.

3. Electrical apparatus according to claim 1, wherein said rotor includes a winding which is connected to a source of weak D.C. excitation whereby said main generator is operated as a synchronous motor.

4. Electrical apparatus according to claim 1, wherein said D.C. generators are electrically connectible in series or parallel, and are excited by a D.C. source of excitation, whereby said D.C. generators may serve as an emergency source of D.C. power.

5. In a turbogenerating plant for generating electricity having a main rotor shaft and at least one main generator arranged on such shaft, said main generator having a rotor and a three-phase stator winding arranged around said rotor, the improvement comprising: using said main generator as a motor to slowly rotate said shaft by connecting the three-phase stator winding of said main generator to a three-phase power source including three D.C. generators electrically connected in star configuration and a three-phase source of A.C. excitation of a frequency substantially less than 60 Hertz with each phase of said three-phase source of A.C. excitation being displaced by 120° and connected to a respective one of the field windings of said D.C. generators, whereby said main shaft is rotated at a speed which is substantially less than the speed at which it would be rotated were said stator winding connected to a commercial power source having a frequency of 60 Hertz.

References Cited

UNITED STATES PATENTS

| | | | |
|---|---|---|---|
| 2,619,629 | 11/1952 | Schmitz | 322—61 XR |
| 2,743,411 | 4/1956 | Abell et al. | 322—61 |
| 2,774,030 | 12/1956 | Abell | 322—61 |
| 2,778,985 | 1/1957 | Schmitz | 322—61 XR |
| 3,271,579 | 9/1966 | Erismann | 290—38 XR |

GLEN R. SIMMONS, Primary Examiner

U.S. Cl. X.R.

290—46, 52; 322—61; 330—58